Nov. 25, 1958                    C. KNUTSEN                    2,861,357
VIEWING AND DISPLAY DEVICE AND METHOD OF DISPLAYING
VIEWS OF OBJECTS IN CONJUNCTION WITH PICTORIAL
REPRODUCTIONS OF INTENDED CHANGES
Filed July 15, 1955                                          3 Sheets-Sheet 1

Christian Knutsen
INVENTOR.

BY

Nov. 25, 1958 C. KNUTSEN 2,861,357
VIEWING AND DISPLAY DEVICE AND METHOD OF DISPLAYING
VIEWS OF OBJECTS IN CONJUNCTION WITH PICTORIAL
REPRODUCTIONS OF INTENDED CHANGES
Filed July 15, 1955 3 Sheets-Sheet 2
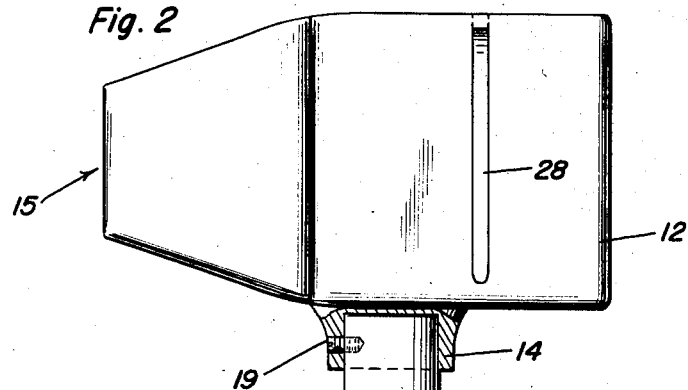
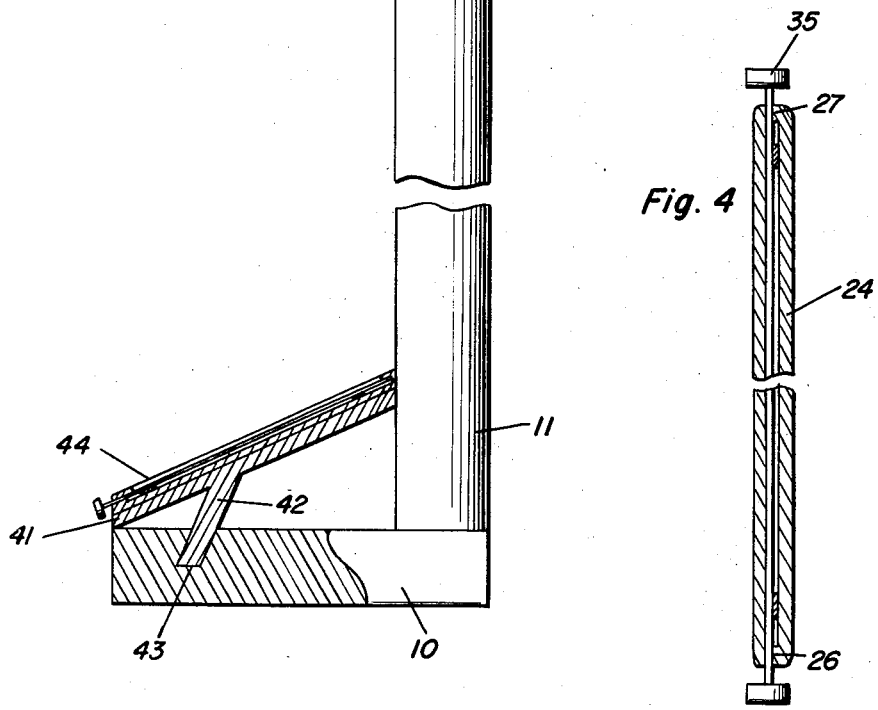
Christian Knutsen
INVENTOR.

Christian Knutsen
INVENTOR.

United States Patent Office 2,861,357
Patented Nov. 25, 1958

2,861,357

VIEWING AND DISPLAY DEVICE AND METHOD OF DISPLAYING VIEWS OF OBJECTS IN CONJUNCTION WITH PICTORIAL REPRODUCTIONS OF INTENDED CHANGES

Christian Knutsen, Lake Shore, Md.

Application July 15, 1955, Serial No. 522,249

8 Claims. (Cl. 35—50)

This invention relates to viewing and display apparatus and it consists in a method and means permitting to superimpose changes and/or additions which are pictorially reproduced on a picture taking surface on the actual image of an object viewed from a predetermined distance through a viewing apparatus.

The object of the invention is primarily to permit an interested person to visualize changes or additions to be made to an object, by looking at the object to be improved or changed through an apparatus displaying an image of the said object to which a pictorial reproduction of the said changes or an imitation of such pictorial reproductions has been applied.

Several attempts have been made to construct a display device showing the effect of intended surface changes on an object especially on a fixed object without actually making such changes, such efforts were made especially in connection with paints of different colors to permit a suitable selection of a color scheme. Insofar as large objects are concerned these display devices almost invariably use models of the objects to be changed or photos, or maps or printed or handdrawn pictures to which the changes are applied. Devices of this type are, however not satisfactory. The application of changes and/or additions to photographs is a convenient method of showing such changes or additions, but produces only a very imperfect impression of what the object will look like when the changes have been made. The use of models on the other hand is only possible within a very restricted field as most large objects, such as houses, gardens and other installations do not usually conform to any fixed model so that a display must either be made on models which only imperfectly correspond to the original or special models have to be constructed for each such intended change at high cost.

Moreover, even where the use of such models is possible because the number of types is restricted, for instance, in the case of automobiles, the miniaturizing has the disadvantage that the impression produced by the model provided with the changes or additions still differs materially from the impression made by the object itself.

The viewing and display apparatus according to the invention, has the primary object of placing the intended changes and/or additions, which are usually changes in the appearance of the surface, on the image of the object itself thus avoiding the effect due to the miniaturization and to the disappearance of the environment of the object and other factors leading to material errors in judging the impression received. While the image of most objects is small, as the objects are usually seen under an angle which does not materially differ from or is even smaller than the angle under which a picture on a reduced scale is viewed, the impression which is produced principally by mental processes is completely different, the human vision, coupled with the mental reconstruction of what is seen when viewing an object furnishing an impression which is correctly translated into the actual scale of the object, while when viewing a picture or model the impression received is rarely, if ever, translated using the proper scale.

The basic feature of the invention consists in providing a method and viewing apparatus adapted to superimpose the intended change and/or addition on the actual image which is seen when looking at the object directly through an optical system. While the intended changes and/or additions are only pictorial reproductions of the changes which it is intended to make, the superimposition nevertheless furnishes and impression which is close to the impression gained by looking at the object itself and thus enables the interested person to visualize or gauge the nature of the change or addition to a much greater extent than this would be possible if only miniaturized models of photographic or other reproductions are used.

In order to carry the invention into effect a combined viewing and display apparatus is used, adapted to produce the image of an object to be changed, which combined viewing and display apparatus is not only equipped with viewing means, but also with means for inserting a reproduction of the change into the field which is viewed and with further means permitting to fit the reproduction into the image with respect to scale and shape so that exact superimposition of the reproduction of the change on the original is possible.

In order to obtain such fitting of the reproduction of the change or addition possible the viewing and display apparatus according to the invention is further provided with scanning and measuring means, permitting to find the exact location and measurement relatively to the contour or other features of the object and with further means, equipped with similar measuring equipment, permitting to copy or reproduce the desired contour on a picture carrying material the structure or design of which corresponds to the outer appearance which is desired. This means facilitates the production of an exactly fitting mask which reproduces the change which is desired as well as the contour and which is then so inserted into the viewing apparatus that exact correspondence between the image actually seen and the mask is obtained, so that the image seems to be provided with the changes, the superimposition of the image of the change reproducing mask producing very nearly the impression of seeing the object with a changed surface.

The main part of the apparatus therefore consists in a viewer, a scanning means, arranged in the plane in which the image is formed, said scanning means being provided with measuring means for obtaining the exact location and size of the portion to be changed and the portion which remains unchanged, a copying means provided with identical or similar measuring means, permitting to shape the reproduction of the surface pattern or design in such a manner that its contour or shape corresponds exactly to the one seen in the viewer and in holding means inserted at the place where the scanning was made which now holds the shaped mask or matt exactly in the position in which it was seen when the scanning means was still in its place, thus producing the impression of the change by superimposition of the mask or matt on the image.

The invention is illustrated in the accompanying drawing showing one embodiment thereof. It is, however, to be understood that the embodiment of the invention illustrated in the drawing is shown by way of example only, in order to explain the principle of the invention and the best mode of applying such principle. It will be clear to the expert conversant with this art that the constructive features are not all essential and may undergo changes and a departure from the construction of the elements shown in the drawing is therefore not necessarily a departure from the principle of the invention.

In the drawing:

Figure 2 is an elevational, partly sectional view of the apparatus.

Figure 4 is an elevational sectional view of the scanning frame.

In order to gain a better understanding of the combined viewing and display apparatus according to the invention, a practical example of the application will first be mentioned.

Let it be assumed that a contractor or salesman wants to demonstrate the effect of a new brick siding on a house. The interested party wants to see the effect of such a brick siding or he may want to select the color of the same.

Of course, the object may also be to see the effect of any other change, such as the addition of a wing or of a doorway or the like to a house.

In order to demonstrate the effect, the contractor or salesman by the means which will be described below, makes a mask or matt fitting exactly the view obtainable by the apparatus, fits it into the apparatus in such a position that the necessary coincidence between the view and the matt is obtained and now lets the interested person inspect the object with the mask or matt fitted into it, the view of the object with the superimposed mask producing more or less exactly the new look the house will have after the alteration is made.

The combined viewing and display apparatus, therefore, has the necessary means for the operation as described.

It will also be understood that for purposes of this type it is of advantage to make the apparatus portable and the example illustrated, therefore, relates to a portable viewing and display apparatus which may be easily disassembled.

Figure 1:
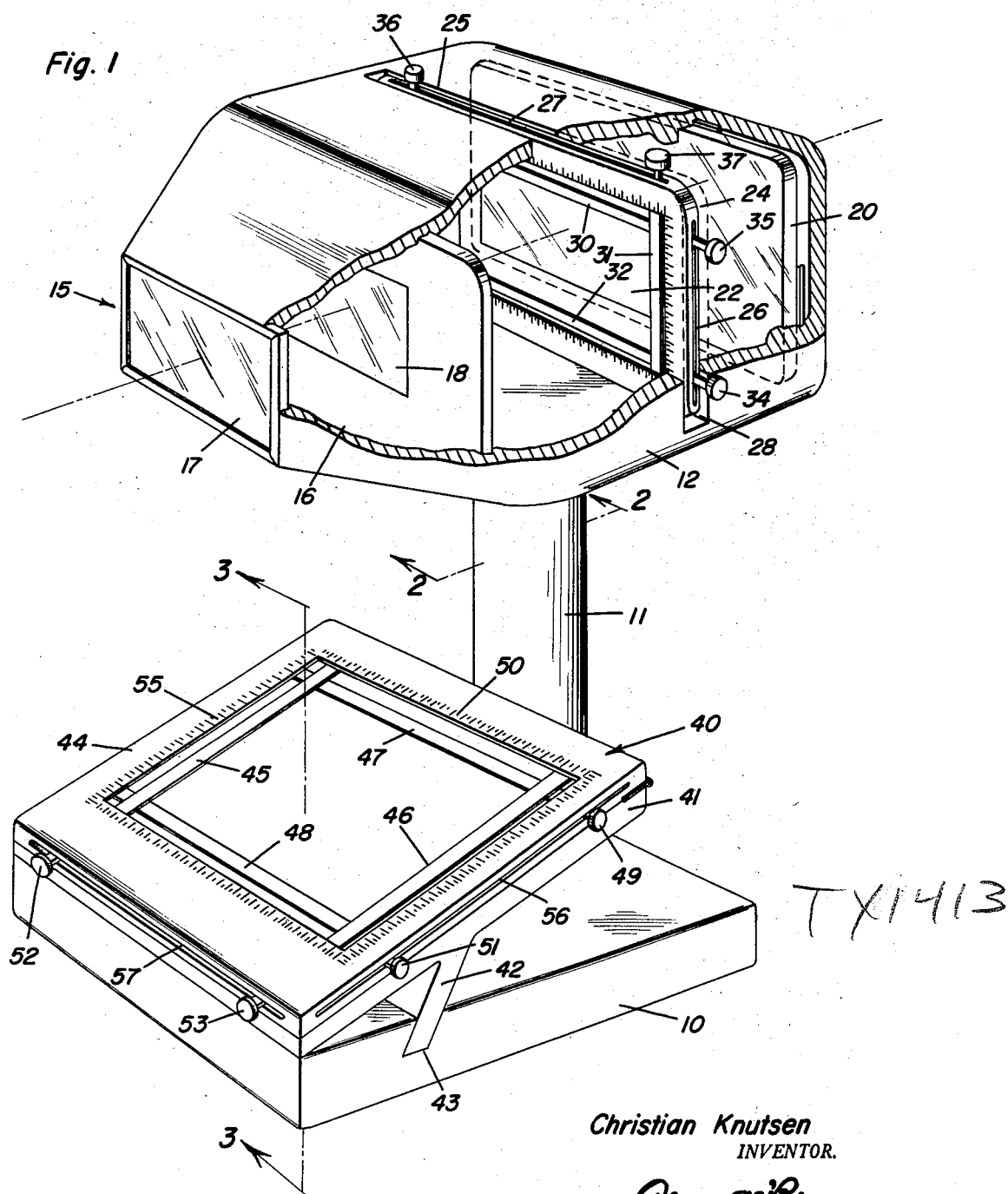
Figure 1 is a perspective view of the combined viewing and display apparatus according to the invention, with part of the apparatus being broken off to show the interior.

The viewing and display apparatus according to the invention comprises a baseboard 10 which may carry a post 11 on which a viewing cabinet or display box 12 is detachably held. The viewing cabinet, as seen in Figure 1, comprises an optical lens system 15 of a well known type which is preferably arranged in the front compartment 16 of the cabinet through which the observer views the display. In Figure 1 the optical system is shown to consist of two lenses 17 and 18 held in rectangular frames, but it will be clear that a single lens will be sufficient and that the apparatus may be used in some instances without a lens system.

The lens system is focused on the plane occupied by a glass scanner plate 22 which will be described below.

At the rear end of the apparatus which is turned toward the object to be viewed, an object plate 20 is mounted in the cabinet. In the particular example illustrated the object plate 20 is merely a glass plate provided with a graduation along the margins. The object plate 20, however, may also be replaced by a lens system and this lens, like the lens system 15, will also be focused on the plane occupied by the glass plate 22.

The glass plate 22 is held in a frame 24 which is inserted and held in a slotted portion 25 in the cabinet 12. As will be seen the slotted portion of the cabinet may receive two different frames in the course of the operations, both however being provided with a plate which may be either transparent or may be semitransparent, like a ground glass, in the event that a lens system is arranged on the object side projecting its picture on the glass plate.

In Figure 1 the glass plate 22 is shown as being held by the scanning frame 24 the side members of which are slotted, the slots being indicated at 26 and 27. Within the slots slide rulers 30, 31, 32, 33 which are movable. They run across and along the scanning frame and are moved manually and for this purpose the ends of the sliding rulers project through the slots and are provided with knobs 34, 35, 36, 37 which may act as handles and which may be provided with fixation means. Preferably, however, the slide rulers which slide within the slots of the frame create a certain friction and stay simply at the place to which they have been moved without any special fixation operation.

As above stated the cabinet is slotted at the top (at 25) and at the side (at 28) so that the scanning frame may be removed and inserted and also in order to operate the sliding rulers while the sliding frame is in its place.

For this purpose the knobs project to such an extent that they may be easily manipulated when the frame is in place.

The slide rulers may consist of metal strips with rigorously straight edges. They may easily be aligned with graduation scales which are provided along the side members of the scanning frame.

The purpose of the scanning frame 24 and of the sliding rulers and graduations along the frame is essentially to locate exactly, for a given position of the combined viewing and display apparatus in which the image of an object is focused on the glass plate 22, those portions of the object which will and those which will not be changed in order to allow an accurate insertion of a mask reproducing the changed surface covering relatively to the image seen through the viewer.

With the assumption which has been made above, namely that a brick siding should be applied to a house, the effect of which it is intended to view before actually applying the brick siding, the changed portions are the walls and the fixed parts which remain unchanged are the doors, windows, dormers etc. and the roof, porch and other parts.

The sliding rulers 30, 31, 32, 33 serve to exactly locate the position of the said parts of the house. They are moved until aligned with the edges of the doors, windows, etc. and thus serve to exactly determine the position of these parts of the house relatively to the view of the house in the viewing apparatus. The position of the sliding rulers which have been aligned with the doors and windows etc. can be ascertained on the marginal graduations 38, 39 of the frame 24.

On the base 10 of the apparatus a copy board and frame 40 may be mounted. The copy board has the same construction which has already been described in connection with the scanning frame. It consists of a frame 44 very much alike to the scanning frame mounted on a heavy board 41 which may serve as a working table. The frame may be fixedly mounted on the working table or may be hinged thereto. To keep the board and frame in its proper position so that it can be conveniently used it is provided with a foot or support 42 which may fit into a groove 43 in the baseboard 10.

The frame 44 on top of the board 41 is also provided with sliding rulers 45, 46, 47, 48, the pair 45, 46 being at right angles to the pair 47, 48, said sliding rulers corresponding to those of the scanning frame 24. The sliding rulers consist of metal strips projecting through slots 56, 57 of the frame 44 and their ends are provided with knobs 49, 51, 52, 53 serving as a handle which permits to move them. Along the sides of the frame graduations 50, 55 are placed which correspond exactly to those provided on the scanning frame in order to locate the sliding members 45, 46, 47, 48 with precision exactly at the same place at which the sliding rulers of the scanning frames have been placed.

The background of the working table within the frame is formed by the top of the working board 41 and the sliding rulers are held in the frame somewhat above the board so that material, having an appreciable thickness such as paper, cardboard, a thin veneer, a Celluloid or a plastic or any other material may be placed on it and worked in the desired manner.

The copy board and frame serving as a working table has the purpose of so shaping the material which is to be superimposed on the image of the house or other object that it fits exactly over certain parts of the image. The material must, of course, be so prepared that it duplicates or imitates the material which it is intended to place on the walls of the house and in the example above mentioned, for instance, the material should show the brick siding pattern imprinted on it. Especially if the apparatus is to be used by professional salesmen or contractors or similar people the product which they want to sell must be reproduced on the various sheets which are used. It is therefore assumed that the surface of the sheet need not be prepared specially for this case, but that simply the contractor or salesman selects from a number of sheets the one which shows the desired pattern. The work of the person operating the viewer for the benefit of the interested party therefore merely consists in shaping a suitable mask fitting exactly the image projected out of such a sheet.

Figure 6:
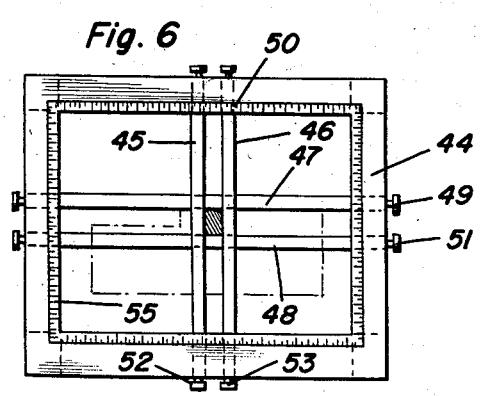
Figure 6 is an elevational front view of the copying frame.

The sheet which has been selected is then placed on the working table or inserted into the copying frame and the operator now operates the scanning frame and the copying frame more or less simultaneously, encircling, for instance, one window after the other by means of the sliding rulers of the scanning frame and reproducing the position of the sliding rulers in the copying frame. He then, for instance, cuts out that portion of the sheet which is visible between the sliding rulers, and (which is hatched in Figure 6) this portion representing a window. He may thus proceed from window to window, or to the door, etc. always reproducing the contour or the part of the house which is encircled between the sliding rulers on the copying board on which these doors, windows, etc. are cut out after they have been marked exactly. In this way a mask or imposure sheet is produced the solid portions of which represent the surface to be covered by the new material, while the cut out portions represent those parts of the house or other objects which remain unchanged and which will therefore continue to be seen after applying the mask.

Figure 7:
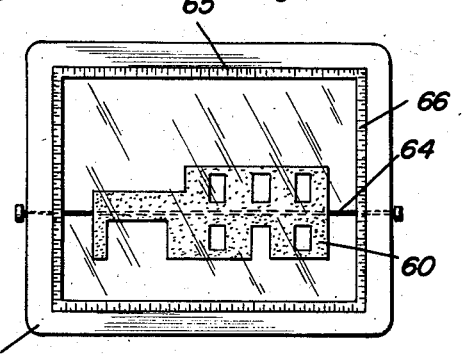
Figure 7 is an elevational view of the holding frame holding the completed mask.

After this mask or imposure piece 60 has thus been produced on the working table by the operator of the display and viewing apparatus, it is now inserted into a special frame 62 (Figure 7) which is somewhat similar to the scanning frame but which may be much simplified. It may merely be provided with one slidable means such as a strip or wire 64 which is shiftable and on which the mask or imposure piece 60 is placed, which place is suitably selected by using the graduations 65, 66 on the side members of the frame. However, the frame may also consist of sheets of transparent plastic forming a pocket into which the mask or matt is inserted at the correct place using the graduation of the frame at the margin. Where a slidable member is used, the mask may be held on the sliding member 64 in any suitable way, for instance, by pointed lugs or pins penetrating into the mask material or by providing the back surface of the sheet with an adhesive which will permit temporary attachment.

After the mask has been suitably positioned in the frame and after removal of the scanning frame from the viewing apparatus, the mask holding frame 62 is inserted into the viewing apparatus where it now occupies the place formerly occupied by the scanning frame, thus placing the mask or superimposure piece 60 held in this frame exactly over the parts of the house or other object the design or color of which is to be changed.

Figure 3:
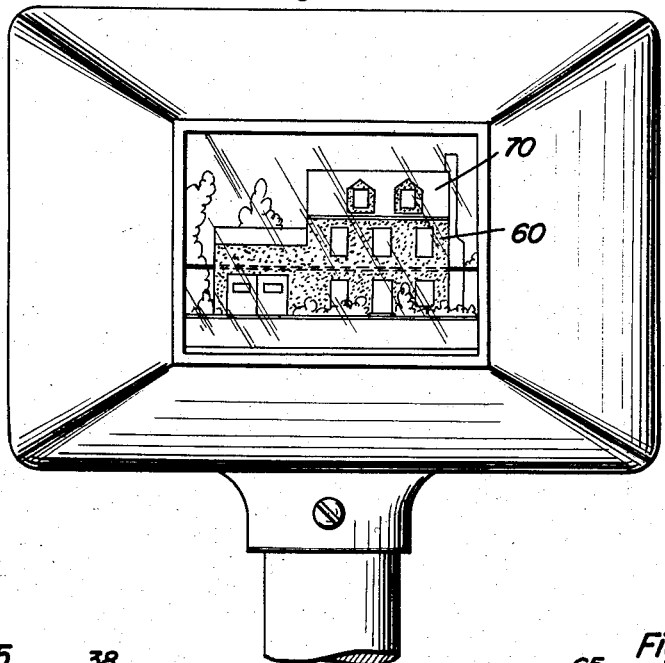
Figure 3 is an elevational front view of the apparatus showing an object covered by a mask which has been produced and is held within the viewing apparatus, this figure also showing the picture as viewed by an observer.
Figure 5:
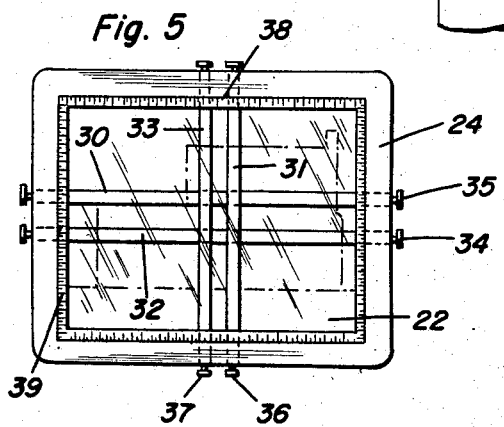
Figure 5 is an elevational front view of the scanning frame.

Figure 3 shows the mask 60 covering up those parts of the house or other object 70 which are to be provided with a new surface covering.

To add to the portability of the apparatus, it is of advantage to connect various parts of it by such means that they may be easily disassembled, for instance, the cabinet 12 may be provided with a short projecting sleeve 14 for receiving the post 11 and may be secured thereon by means of a setscrew 19. Similar arrangements may be made on the other side of the post in order to hold the same on the baseboard 10 if this appears to be of advantage.

It will be clear that many constructive features of the apparatus may be changed without in any way departing from the essence of the invention as defined in the annexed claims.

What is claimed as new is as follows:

1. A method of producing combined displays embodying an actual view of an object and preselected pictorial elements, which consists in producing an image of the actual object in a scanning plane containing graduations, determining the exact position of the contour of those portions of the picture where the pictorial elements have to be placed relatively to said graduations and marking the contour lines by indicator elements, placing a sheet carrying the pictorial elements to be displayed on a second plane having graduations and marking indicator elements identical with those of the scanning plane, producing an exact replica of the contour lines on the said sheet by bringing said indicator elements into the same position relatively to the graduations into which the marking indicator elements have been placed on the scanning plane, cutting out said contour from said sheet and placing the cut-out into a frame into a position corresponding exactly to the position of the marking indicator elements in the scanning frame, removing the scanning frame from the scanning plane inserting the frame with the cut-out and viewing the object, a portion of the image of the object being now covered by the cut-out containing the pictorial elements, said pictorial elements being thus superimposed on the actual object view along the preselected contour for an observer viewing the object in the scanning plane.

2. A display and viewing apparatus for producing combined displays, embodying actual views of objects and preselected pictorial elements, comprising means for superimposing a mask with pictorial elements representing changes to be made on an object over an image of the said object produced in a viewing plane, said means including a viewing device for an observer viewing the object, the image of the object being produced in a predetermined scanning plane between the observer and the object, means for determining the position of selected contour lines, separating portions of the object image to be viewed unchanged and those to be covered by a superimposed pictorial element, relatively to the predetermined scanning plane in the viewing device, means for reproducing exactly the selected contour lines of the portions of the object to be covered by pictorial elements on a sheet provided with said pictorial elements to be superimposed, to enable an operator to cut the sheet along the contour lines to produce a mask, and means for holding the mask within the viewing device substantially in the predetermined scanning plane between the said plane and the observer in a position in which the mask covers the selected contour of the image to be changed when the object is viewed through the viewing apparatus by an observer.

3. A display and viewing apparatus for producing combined displays, embodying the image of an object and preselected pictorial elements, comprising means for superimposing a mask with the preselected pictorial elements representing changes to be made on the image of an object over the image of the said object in a viewing plane, said means including a viewing device for an observer viewing the image of the object in a predetermined viewing plane, said viewing device further including a viewing cabinet provided with a slot located in the said viewing plane in which the image of the object is viewed, a scanning frame, temporarily insertable through said slot into the said viewing cabinet, means on said scanning frame for determining the exact position of selected contour lines of the object viewed, separating its changed and unchanged parts in the plane of the image of the object relatively to said scanning frame, a copying frame in fixed relation to said viewing cabinet arranged within full view of the observer when in an image viewing position without change of position and within reach of the observer's hand, said copying frame being provided with position determining means identical with those provided on the scanning frame, said means on the copying frame, when brought into positions corresponding to those of the scanning frame, exactly reproducing the position of the selected contour lines separating changed and unchanged portions of the image and enabling the operator to cut out of a masking sheet containing preselected pictorial elements, when placed on the copying frame, a mask along the contour lines, a means for holding said mask in the viewing apparatus in the viewing plane after removal of the scanning frame, at a place corresponding to the place of the selected contour marked on the scanning frame by the indicating elements.

4. A combined display and viewing apparatus as claimed in claim 3 wherein the scanning frame comprises slotted frame members, a plurality of shiftable sliding rulers operable in directions at right angles to each other, graduation scales along the frame members, and means for shifting said sliding rulers to align them with contour and dividing lines on the object separating portions of the object to be changed from remaining unchanged portions of the object.

5. A combined display and viewing apparatus as claimed in claim 4 wherein the copying frame comprises slotted frame members, a plurality of shiftable sliding rulers operable in directions at right angles to each other, graduation scales along the frame members, corresponding to analogous members and graduation scales of the scanning frame to align the shiftable rulers in the copying frame to adopt positions in exact correspondence with the positions of the corresponding shiftable rulers of the scanning frame.

6. A combined display and viewing apparatus as claimed in claim 3 wherein a mask carrying frame is adapted to be placed into the slotted viewing apparatus after removal of and in place of the scanning frame, said mask carrying frame being slotted and provided with a transversely movable member, projecting from the frame outwardly, and provided with a knob, the frame being provided with graduations corresponding to those of the scanning frame.

7. A combined display and viewing apparatus as claimed in claim 3 wherein the viewing device and viewing cabinet is mounted on a baseboard provided with an upright post, said viewing device and cabinet being removably attached to said post, and wherein the copying frame is supported by a copying work board mounted on the base board below the viewing device, to facilitate the location of the dividing lines on the mask sheet during observation of the object through the viewing device.

8. A display and viewing apparatus for producing combined displays embodying an actual view of an object and preselected pictorial elements, comprising means for superimposing a mask with the preselected pictorial elements over the image of said object in a viewing plane, said means including a viewing device for an observer viewing the image of the object in a predetermined viewing plane, said viewing device being provided with a viewing cabinet having a slot in the viewing plane in which the image of the object appears, a removable scanning frame insertable through said slot into the viewing cabinet and held in the viewing plane when inserted, shiftable position indicating members and graduations on said scanning frame to determine, while viewing the object, the position of selected contour lines separating portions of the object to be provided with superimposed pictorial elements from those which remain unchanged, a copying frame in fixed relation to said viewing cabinet, arranged within full view of the observer when in the correct position for viewing the image without change of position of the observer and within reach of the observer's hand, said copying frame being provided with shiftable members and graduations substantially duplicating those of the scanning frame, and being adapted to hold a mask sheet provided with the selected pictorial elements on which the selected contour lines and the exact location of the said contour lines relatively to portions of the object are marked, thus permitting the cutting of a mask reproducing the contour lines on the scale of the image of the object in the viewing device, and mask holding frame means for holding said mask in the viewing device in the viewing plane in which the image of the object is viewed, said mask thus covering the image of the object when viewed by the observer exactly to the extent to which pictorial elements are to be superimposed on the image.

References Cited in the file of this patent

UNITED STATES PATENTS

| | | |
|---|---|---|
| 2,079,508 | Kaplowitz | May 4, 1937 |
| 2,256,894 | Chadkin | Sept. 23, 1941 |
| 2,494,077 | Wilkinson | Jan. 10, 1950 |
| 2,519,610 | Sussin | Aug. 22, 1950 |